United States Patent [19]
Cromie

[11] 3,722,004
[45] Mar. 27, 1973

[54] DISC FOR HEART VALVES
[75] Inventor: Harry W. Cromie, Pittsburgh, Pa.
[73] Assignee: Baxter Laboratories, Inc., Morton Grove, Ill.
[22] Filed: Dec. 8, 1971
[21] Appl. No.: 205,852

[52] U.S. Cl. ..................... 3/1, 3/DIG. 3, 137/533.19
[51] Int. Cl. ............................................. A61f 1/22
[58] Field of Search .......... 3/1, DIG. 3; 137/532, 533, 137/533.19, 516.25–516.29

[56] References Cited

UNITED STATES PATENTS

| | | | |
|---|---|---|---|
| 3,438,394 | 4/1969 | Nakib | 3/1 X |
| 3,503,079 | 3/1970 | Smith | 3/1 |
| 3,534,411 | 10/1970 | Shiley | 3/1 |
| 3,579,645 | 5/1971 | Bokros | 3/1 |

FOREIGN PATENTS OR APPLICATIONS 1,016,811  1/1966  Great Britain ..................... 3/DIG. 3

OTHER PUBLICATIONS

"Mitral Replacement" by A. Starr et al., Journal of Thoracic & Cardiovascular Surgery, Vol. 54, No. 3, September 1967, pages 333–358.
"The Evaluation of Experimental Mitral Valve Prostheses in the Dog" by F. S. Cross et al., Surgery, Vol. 65, No. 1, pages 89–97, January 1969.

Primary Examiner—Richard A. Gaudet
Assistant Examiner—Ronald L. Frinks
Attorney—W. Garrettson Ellis

[57] ABSTRACT

A heart valve occluder includes a ring of hard, wear-resistant material such as isotropic, pyrolytic carbon embedded in a plastic matrix with the outer circumference of the ring protruding from the plastic about the entire circumference of the occluder. By this arrangement, the wear rate on the edge of the occluder is improved, while the noise of the occluder striking the struts of its cage is reduced.

10 Claims, 5 Drawing Figures

PATENTED MAR 27 1973 3,722,004

Inventor
Harry W. Cromie
By W. Garretson Ellis
Atty

DISC FOR HEART VALVES

BACKGROUND OF THE INVENTION

Reciprocating occluder type heart valves are well known, and are in routine use by many surgeons for replacement of defective natural heart valves.

While heart valve occluders made of plastic, and occluders made of hard materials such as isotropic pyrolytic carbon (see U.S. Pat. No. 3,526,005),are previously known, each type of occluder has its own particular disadvantage.

Plastic valve occluders may tend to wear at their edges because, as they move between open and closed positions, their edges rub against the struts of the cage or other means used to retain them in position. However, while pyrolytic carbon valve occluders exhibit much less edge wear, they create excessive noise and shock as they slam against the outer portion of the cage upon coming to a halt after moving from the closed position in the valve orifice to an open position. The noise from this is audible even after implantation of the valve, and the continuous repeated shock on the occluder itself may cause cracks to develop in the rigid, brittle pyrolytic carbon material, or cause chips to break off, which is potentially disastrous.

In accordance with this invention, a heart valve is provided which solves the problems of both types of heart valve occluders to provide a long-lived valve occluder that does not produce excessive noise or shock when the occluder slams against the top of the valve cage.

DESCRIPTION OF THE INVENTION

Figure 1:
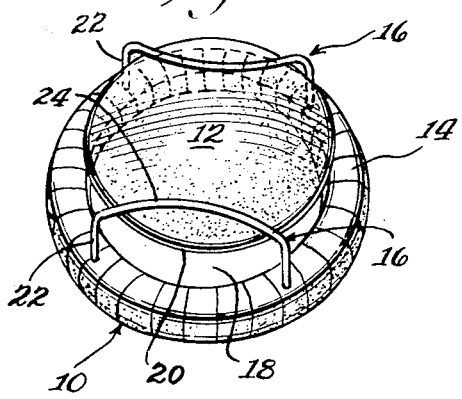
FIG. 1 is a perspective view of a typical occluder disc type heart valve utilizing a disc of this invention, in open position.
Figure 2:
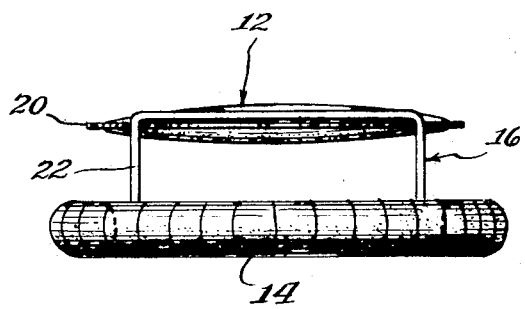
FIG. 2 is an elevational view of the valve of FIG. 1.

Referring to the drawings, FIG. 1 shows a typical heart valve 10 in which occluder disc 12 of this invention can be used. Valve ring 14 defines the valve orifice against which the disc rests to block the flow of blood in closed position. Valve ring 14 is shown to be wrapped in suturing fabric, although many other designs of heart valve ring can be used in conjunction with the occluder of this invention: for example, a multiple piece valve orifice ring containing a pyrolytic carbon orifice, and a fabric-wrapped outer periphery for suturing. Struts 16, typically made of titanium coated with pyrolytic carbon or the like, are arranged to hold disc 12 in position to permit the disc to reciprocate back and forth between an open position as shown in FIG. 1 and a flow occluding position in which disc 12 is against orifice ring 14, blocking orifice 18.

In accordance with this invention, disc 12 has a periphery 20 about its entire circumference made of a hard, physiologically suitable wear-resistant material such as isotropic, pyrolytic carbon, titanium, or the like. The remainder of disc 12, seen from the outside, comprises a softer physiologically suitable plastic material such as polyethylene of ultra high molecular weight (e.g., 1 to 3 million), polypropylene, or polycarbonate resin. Thus, as periphery 20 of disc 12 rubs against the vertical portions 22 of struts 16 while opening and closing, the edge wear of the disc is very slight when compared with an all plastic disc. However, when disc 12 slams against the horizontal portions 24 of struts 16 at the end of the opening phase, the slight flexibility of the plastic material of disc 12 reduces both the noise and the shock encountered when the disc is brought to a halt in the open position.

Figure 3:
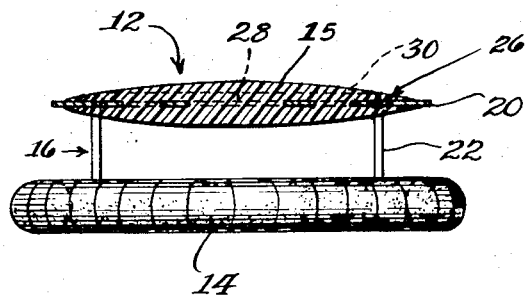
FIG. 3 is an elevational view of the same valve with the disc shown in vertical section.
Figure 4:
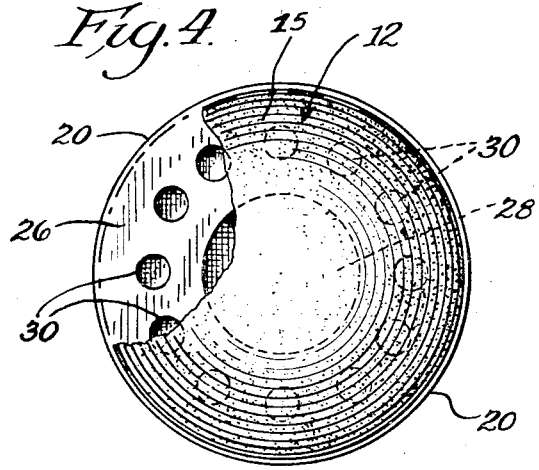
FIG. 4 is a plan view of the valve disc of this invention with portions of the plastic material broken away to show the ring of hard, wear-resistant material embedded in the disc.
Figure 5:
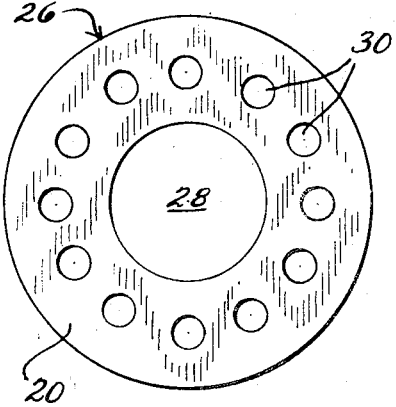
FIG. 5 is a plan view of the ring of hard, wear-resistant material used in the valve disc of this invention.

Referring to FIGS. 3 through 5, periphery 20 is seen to be the outer circumference of a rigid ring 26 which protrudes from plastic 15 about the entire circumference of disc 12. Ring 26 defines a relatively large central aperture 28 and a plurality of smaller apertures 30 which are radially spaced from the central aperture.

The valve disc of this invention is typically manufactured by compression molding plastic 15 about ring 26 so that the molten plastic enters into intimate contact with the entire surface of ring 26, passing through the apertures 28, 30 to fuse with plastic on the other side. Thus ring 26 is firmly and intimately bonded with the plastic, so that any shrinkage of the plastic after molding does not cause ring 26 to become loose and exhibit any "play" relative to the plastic 15.

Other occluder members can utilize the invention of this application besides valve discs. For example, a poppet valve type structure made of plastic and residing in a cage may include a ring similar to ring 26, with its periphery protruding from said poppet about the line at which most sliding frictional contact is made between the poppet and the cage.

The above has been offered for illustrative purposes only, and is not intended to restrict the scope of the invention, which is defined in the claims below.

That which is claimed is:

1. A heart valve occluder member which comprises a ring of hard, wear-resistant material embedded in a plastic matrix softer than said hard wear-resistant material with the outer circumference of said ring protruding from said plastic about the entire outer periphery of said occluder member said hard material and plastic being physiologically suitable for implanation in a living body.

2. The heart valve occluder member of claim 1 in which said ring defines a central aperture, and a plurality of smaller apertures which are radially spaced from said central aperture.

3. The heart valve occluder member of claim 2 which is a disc, wherein said ring protrudes about the entire outer circumference of said disc.

4. The heart valve disc of claim 3 in which said ring comprises isotropic, pyrolytic carbon.

5. The heart valve disc of claim 4 in which said plastic matrix is selected from the group consisting of ultra high molecular weight polyethylene, polypropylene, or polycarbonate resin.

6. In a heart valve, an occluder member which comprises a flat member of hard, wear-resistant material embedded in a plastic matrix softer than said hard wear-resistant material with the outer circumference of said flat member protruding from said plastic about the entire outer periphery of said occluder member along a line of sliding contact of said occluder member with a remaining portion of said heart valve as said occluder member opens and closes, said hard material and plastic being physiologically suitable for implanation in a living body, whereby said outer circumference of the flat member provides a wear-resistant sliding contact with the remainder of said heart valve.

7. The heart valve of claim 6 in which said flat member is a ring.

8. The heart valve of claim 7 in which said occluder member is a disc, wherein said ring protrudes from said plastic about the entire outer circumference of said disc.

9. The heart valve of claim 8 in which the flat member ring of hard, wear-resistant material within said disc defines a central aperture and a plurality of smaller apertures which are radially spaced from the central aperture.

10. The heart valve of claim 9 in which said ring comprises isotropic, pyrolytic carbon.

* * * * *